US 6,709,580 B2

(12) United States Patent
Ouwinga

(10) Patent No.: US 6,709,580 B2
(45) Date of Patent: Mar. 23, 2004

(54) POND SKIMMER

(75) Inventor: David M. Ouwinga, Grant, MI (US)

(73) Assignee: Stoney Creek Equipment Company, Grant, MI (US)

( * ) Notice: Subject to any disclaimer, the term of this patent is extended or adjusted under 35 U.S.C. 154(b) by 70 days.

(21) Appl. No.: 09/971,209

(22) Filed: Oct. 4, 2001

(65) Prior Publication Data

US 2002/0175117 A1 Nov. 28, 2002

(51) Int. Cl.[7] .................................................. A01K 63/04
(52) U.S. Cl. ...................... 210/169; 210/170; 210/416.2
(58) Field of Search ................................. 210/169, 170, 210/242.1, 416.1, 416.2

(56) References Cited

U.S. PATENT DOCUMENTS

| 2,900,079 | A | * | 8/1959 | Pace | 210/169 |
| 4,454,035 | A | * | 6/1984 | Stefan | 210/242.1 |
| 4,818,389 | A | * | 4/1989 | Tobias et al. | 210/416.2 |
| 4,826,591 | A | * | 5/1989 | Macia | 210/416.2 |
| 5,052,855 | A | * | 10/1991 | Chapman et al. | 210/242.1 |
| 5,285,538 | A | * | 2/1994 | Hodak | 210/416.2 |
| 5,584,991 | A | | 12/1996 | Wittstock et al. | 210/170 |
| 5,753,113 | A | * | 5/1998 | Hendricks | 210/169 |
| 6,054,045 | A | | 4/2000 | Wittstock et al. | 210/242.1 |
| 6,290,844 | B1 | * | 9/2001 | Tennyson, Jr. | 210/170 |
| 6,527,949 | B1 | * | 3/2003 | Hedberg et al. | 210/170 |

* cited by examiner

Primary Examiner—Christopher Upton
(74) Attorney, Agent, or Firm—Price, Heneveld, Cooper, DeWitt & Litton

(57) ABSTRACT

Filtering skimmers for ornamental ponds are provided that more effectively conceal the filtering skimmer to improve the appearance of the ornamental pond, and/or allow a filtering element to be mounted either vertically or horizontally. The filtering skimmer may include a conduit that projects laterally away from the sidewall of the filtering skimmer land defines a ledge onto which materials may be deposited to conceal the inlet of the filtering skimmer. In another aspect, an elongated extension tube provides a fluid passageway from an ornamental pond to the filtering skimmer inlet to facilitate better concealment of the filtering skimmer. In a further aspect, the filtering skimmer has opposing internal channels for retaining a substantially planar filtering element in a vertical orientation, and structure for supporting a filtering element in an alternative horizontal orientation.

3 Claims, 4 Drawing Sheets

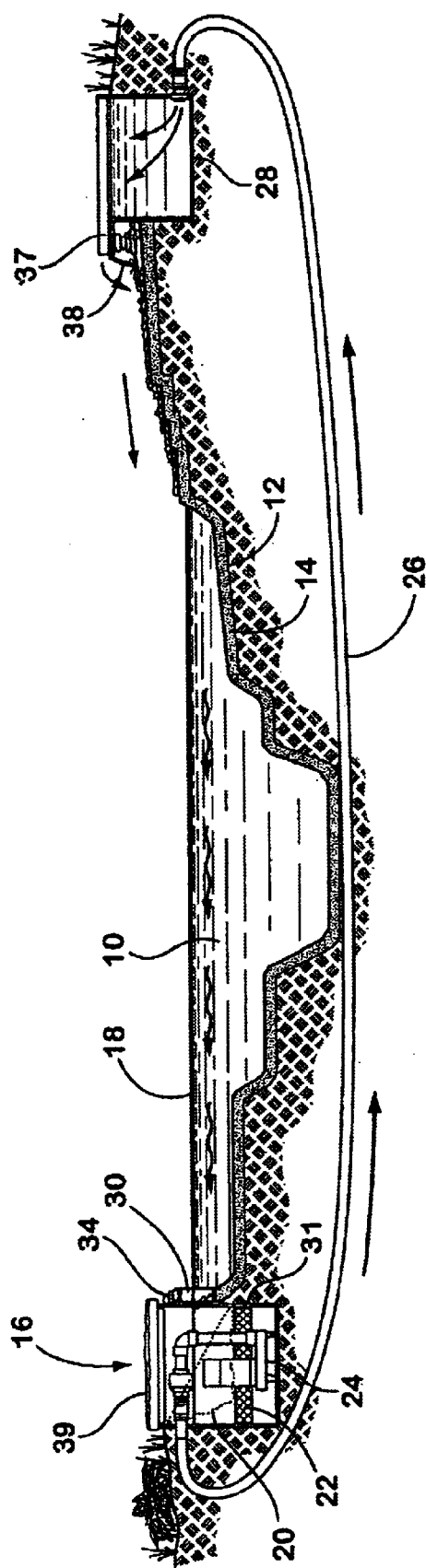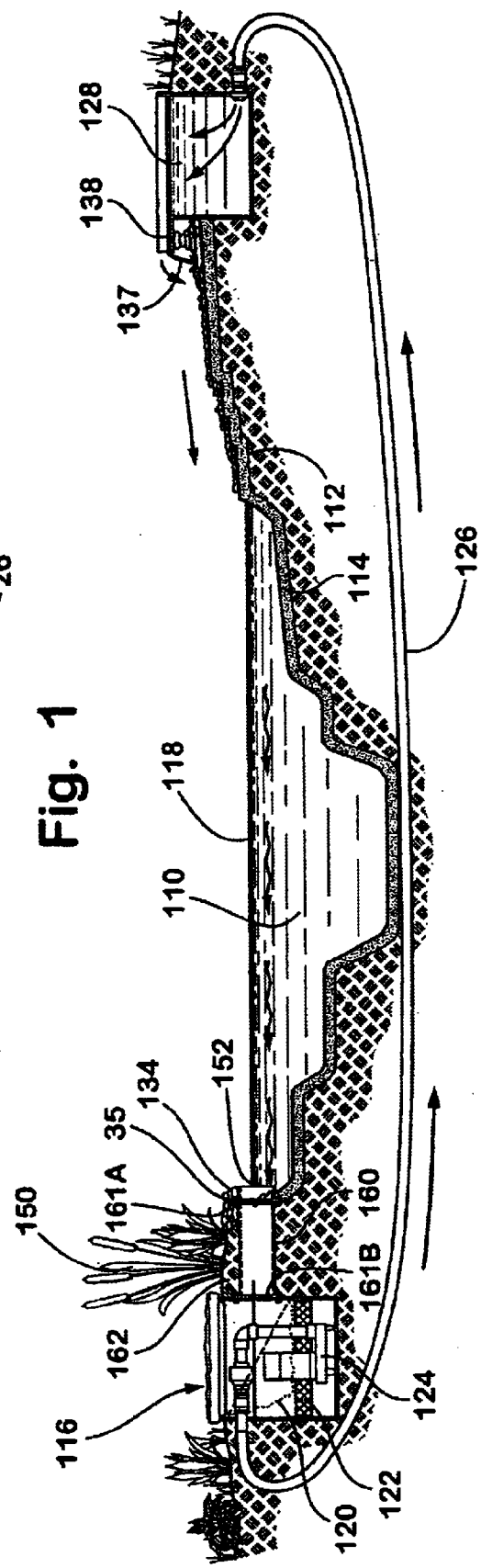

POND SKIMMER

FIELD OF THE INVENTION

The invention generally relates to filtering skimmers for an ornamental outdoor pond, and more particularly to filtering skimmers having features that facilitate improved concealment of the filtering skimmer and/or improved flexibility/convertibility in filtering element orientation.

BACKGROUND OF THE INVENTION

It is generally desirable to use a filtering skimmer to remove foliage and other debris from the surface of an ornamental pond and organic matter from the pond water to control algae growth. This is especially important when the pond contains fish, such as goldfish or koi. Use of a filtering skimmer improves the appearance and clarity of the pond water and helps maintain a healthy environment for goldfish, koi, frogs, etc.

Filtering skimmers generally comprise a tub-like enclosure having a lid. A fluid inlet aperture is provided in a sidewall of the enclosure. The filtering skimmer is generally located adjacent an edge of the pond with the lower edge of the fluid inlet located below the desired liquid level of the pond and the upper edge of the fluid inlet located above the desired liquid level of the pond. To provide a flow of water across the pond a pump contained in the enclosure conveys water preferably to a location near the opposite edge of the pond. This causes water in the pond to circulate across the pond and through the filtering skimmer. The current created by the pump causes foliage and other matter on the surface of the pond to enter the fluid inlet of the filtering skimmer. Foliage and similar materials floating on the surface of the pond are typically collected in a bag-like net located at the inlet of the filtering skimmer. Water first passes through the inlet aperture, then through the net, and then through the filtering elements before being pumped out of the filtering skimmer. The filtering elements comprise one or more fibrous mats that are typically supported either in a substantially vertical orientation or in a substantially horizontal orientation.

A problem with conventional pond filtering skimmers is that, although they are usually partially buried in a berm adjacent the pond, at least the upper section of the filtering skimmer projects above ground level and is usually clearly visible. This detracts from the aesthetic appeal of the ornamental pond. Attempts to conceal or camouflage the filtering skimmer have usually been limited to providing a lid with an upper surface designed to simulate the appearance of pebbles or stones. Unfortunately, even the casual observer cannot help but notice the pond filtering skimmer apparatus despite attempts to obscure its presence. Accordingly, there is a need for an improved pond filtering skimmer apparatus that is better concealed to preserve the beauty of an ornamental pond.

Another problem with conventional pond filtering skimmers is that they do not permit flexibility/convertibility of the filtering element orientation. A vertical orientation is desired when ease of removal of the filtering element for cleaning or replacement is desired. However, a disadvantage of vertically orienting the filtering element (i.e., so that the plane of the filtering element is arranged substantially perpendicular to a horizontal reference plane) is that the filtering element requires more frequent cleaning (i.e., plugs up more frequently) due to a lower average hydrostatic head pressure across the surface of the filtering element. A substantially horizontally oriented filtering element (i.e., with the plane of the filtering element arranged substantially parallel to a horizontal reference plane) is less susceptible to plugging because there is a higher average hydrostatic head pressure across the surface of the filtering element. However, removal of a horizontally oriented filtering element is more difficult, often involving removal of the bag-like foliage collecting net before reaching downwardly under water contained in the filtering skimmer enclosure to remove the filtering element.

Conventional pond filtering skimmers are configured to allow only a single predetermined orientation of the filtering element either in a substantially vertical orientation or a substantially horizontal orientation. Therefore, the pond owner must decide in advance whether ease of cleaning with the consequent greater frequency of cleaning needed for vertical orientation of the filtering element is preferred, or if less frequent cleaning accompanied by more difficult removal of the filtering element associated with a horizontal orientation is preferred.

Those individuals that are not experienced at maintaining an ornamental pond would likely prefer an opportunity to try each of the different filtering element orientations before selecting a preference. Even those individuals that are familiar with both types of filtering skimmers (i.e., those configured for vertical orientation of the filtering element and those configured for horizontal orientation of the filtering element) may desire the ability to change their selection of filtering element orientation occasionally.

SUMMARY OF THE INVENTION

The invention offers improved filtering skimmers for ornamental ponds that can be more easily and effectively concealed and/or camouflaged to improve the appearance of the ornamental pond, and/or improved filtering skimmers that allow a filtering element to be mounted either substantially vertically or substantially horizontally.

In accordance with one aspect of the invention there is provided an improved filtering skimmer for an ornamental pond in which the fluid inlet to the filtering skimmer can be more easily concealed or camouflaged. The filtering skimmer includes an enclosure defining an internal chamber containing a pump and a filtering element disposed in a fluid pathway between the inlet and the pump. The improvement comprises a conduit projecting laterally away from the sidewall and the inlet aperture and optionally having a flange that defines a lip which projects upwardly from an outer edge of the conduit. The conduit defines a ledge onto which pebbles, stones or other materials may be deposited and retained preferably between the sidewall and the lip to conceal the inlet of the filtering skimmer.

In accordance with another aspect of the invention, a filtering skimmer system for an ornamental outdoor pond includes, in combination, an enclosure defining an internal chamber containing a pump and a filtering element disposed in a fluid pathway between the inlet and the pump, and an elongated extension tube attached to the fluid inlet to provide a fluid passageway from a pond to the filtering skimmer inlet, whereby the filtering skimmer can be spaced away from the edge of the pond to allow better concealment such as behind plants.

In accordance with a further aspect of the invention, there is provided a convertible filtering skimmer for an ornamental pond which facilitates either substantially horizontal or substantially vertical mounting of a filtering element. The filtering skimmer includes an enclosure having substantially upright sidewalls defining an internal chamber with a fluid inlet aperture defined through one of the upright sidewalls to allow water to flow from an ornamental pond into the internal chamber. The filtering skimmer contains a pump and a filtering element disposed in a fluid pathway between the inlet and the pump. The sidewalls of the filtering skimmer includes opposing internal channels that extend longitudinally in a substantially vertical direction for retaining a substantially planar filtering element in a substantially vertical orientation in a fluid path between the inlet and the pump. The filtering skimmer also includes internal support structure defining horizontal support surfaces for supporting a planar filtering element in a substantially horizontal orientation in the fluid flow path between the inlet and the pump.

These and other features, advantages and objects of the present invention will be further understood and appreciated by those skilled in the art by reference to the following specification, claims and appended drawings.

BRIEF DESCRIPTION OF THE DRAWINGS

FIG. 1 is a schematic cross-sectional representation of a decorative pond in accordance with an aspect of the invention.

FIG. 3 is a schematic cross-sectional representation of an ornamental pond in accordance with an alternative embodiment of the invention.

DETAILED DESCRIPTION OF PREFERRED EMBODIMENTS

Figure 2:
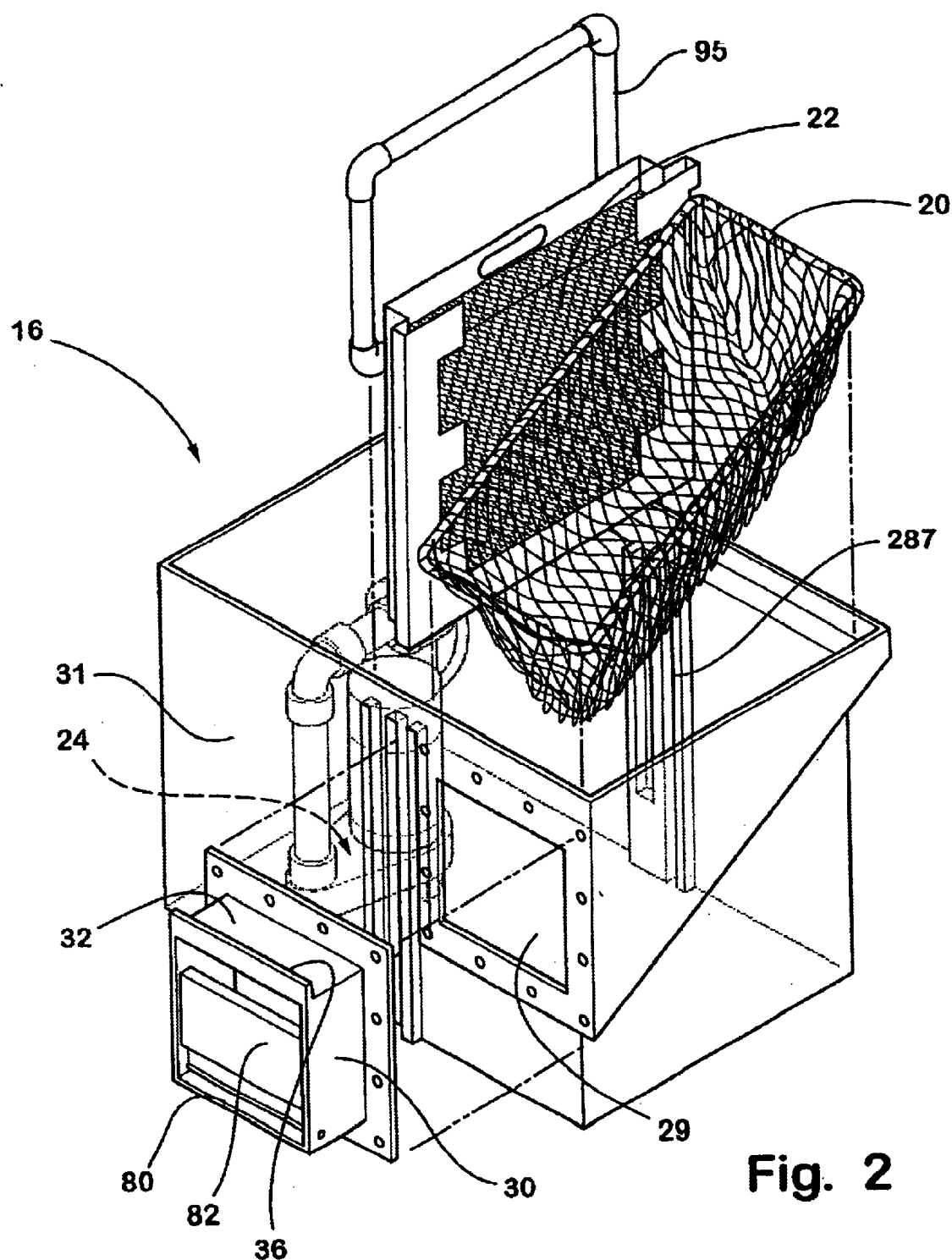
FIG. 2 is an enlarged perspective view of a filtering skimmer in accordance with the invention shown in FIG. 1.

In FIG. 1, there is shown a schematic cross section of a typical ornamental pond utilizing a pond filtering system including a filtering skimmer. The pond 10 is defined by a pond bed 12. To retain water in the pond bed 12, the bed is typically lined with a liner 14, such as a fish safe EPDM (ethylene-propylene-diene multipolymer) sheet. Other types of liners, such as concrete liners, may be used if desired. Also, although a liner is desirable, it is not essential.

Ornamental ponds include generally any pond that is used as landscape ornamentation, and includes garden ponds, koi ponds, goldfish ponds, frog ponds, etc.

In general, it is highly desirable to utilize a filtering skimmer 16 for removing foliage and other debris floating on the pond surface 18, and for filtering organic nutrients from the pond water to control algae growth. The filtering skimmer 16 is a tub-like enclosure having substantially upright sidewalls defining an internal chamber containing a sack-like net 20 for collecting foliage and other debris, filter elements 22 for collecting organic nutrients, and a submerged pump 24 for circulating filtered water back into the pond.

For the pond shown in FIG. 1, the filtered water is conveyed through a conduit 26 into a tank 28 which is configured to define an overflow weir 37 that provides a waterfall 38 which enhances aeration (oxygenation) of the pond water. Although desirable, a waterfall 38 is not necessary, and, as an alternative, filtered water can be pumped directly back into the pond. However, it is generally desirable to introduce the filtered water back into the pond at a location on the opposite side of the pond from which the filtering skimmer 16 is located to create a flow pattern across the pond which helps convey any materials floating on the surface of the pond into the filtering skimmer 16 where it is collected in sack-like net 20.

In accordance with an aspect of this invention, the filtering skimmer 16 shown in FIG. 1 is designed with a conduit 30 projecting outwardly away from the inlet aperture 29 defined in a sidewall 31 of the filtering skimmer.

The filtering skimmer 16 and conduit 30 projecting laterally away from the sidewall 31 OF at the inlet aperture 29 of the filtering skimmer are shown in greater detail in FIG. 2. The projecting conduit 30 has a generally square or rectangular cross section with a flat, substantially horizontal upper ledge 32 that can be used for stacking materials, such as pebbles, stones, rocks or other items 34 (FIG. 1). A flange 35 is provided on conduit 30 to allow conduit 30 to be bolted to sidewall 31 at aperture 29 of skimmer 16. A lip 36 that projects upwardly from the outer edge of ledge 32 may be provided to help retain pebbles, stones, rocks or other items 34 on ledge 32. This allows the filtering skimmer 16 to be more effectively concealed and/or camouflaged. For example, stones 34 can be stacked up on ledge 32 (such as shown in FIG. 1) such that only the lid 39 of the filtering skimmer 16 is exposed in plain view. The length of conduit 30 (i.e., the distance that conduit 30 projects from sidewall 31) is not critical, but is generally about 6 inches or less, and typically at least about 2 inches to allow rock, pebbles or the like to be stacked on the ledge.

In accordance with another aspect of the invention, a pond 10 defined by a pond bed 112, and optionally having a pond liner 114, is provided with a filtering skimming apparatus 116 that is located at a sufficient distance from the edge of pond 110 to allow filtering skimmer 116 to be concealed from a view of the pond such as by plant 150 located between an edge 152 of pond 110 and the filtering skimmer 116 (FIG. 3). Filtering skimmer 116 is generally similar to filtering skimmer 16, and includes a sack-like net 120 for collecting foliage and other debris that floats on the pond surface 118, a filter element 122 for removing nutrients from the pond water, and a pump 124 for circulating filtered water back to the pond through conduit 126. As with the embodiment shown in FIG. 1, it is desirable for aesthetic reasons and for improving aeration of the pond water, but not essential, to pump the filtered pond water into a tank 128 having an overflow weir 137 that generates a waterfall 138.

An important difference between the embodiment of the invention shown in FIG. 3 and conventional ponds utilizing a filtering skimmer is that the filtering skimmer 116 is more effectively concealed from view behind plants 150. This is facilitated by an extension tube 160 that may be buried under a berm 162. Extension tube 160 may have at opposite ends thereof flanges 161A and 161B that allow tube 160 to be bolted to sidewall 31 at aperture 29 on one end and allow conduct 30 to be bolted to the other end. As with the previously discussed embodiment shown in FIG. 2, pebbles, stones, rocks and other items 134 may be deposited on ledge 32 to provide very effective concealment of the filtering skimmer 116 and extension tube 160. Extension tube 160 may be secured to filtering skimmer 116 in generally any conventional manner, either before shipment to its point of use, or more desirably during or immediately before installation.

Extension tube 160 may be of generally any length, but is preferably long enough to position the filtering skimmer a distance from the edge of the pond that is sufficient to allow a shrub or other plant to be positioned between the edge of the pond and the filtering skimmer to help conceal the filtering skimmer. A suitable length is at least about two feet. The extension tube 160 can be of a standard length such as two feet and a plurality of extension tubes can be connected (e.g., bolted) together to provide generally any desired length.

Operation of skimmers 16 and 116 is generally the same as conventional commercially available filtering skimmers. In generally, the inlet aperture is located at the level of the pond surface 18 or 118. To insure that leaves and other matter which are deposited on the pond surface 18, 118 can flow into the filtering skimmer 16, 116, the filtering skimmer 16, 116 should be buried so that the desired lower level of the pond is at least about 2 inches above the lower edge 80 (FIG. 2) of the inlet opening. In addition, the height of the inlet opening should be sized so that the upper edge of the inlet opening is equal to or higher than the desired upper level of the pond surface 18, 118. As is known in the art, a flapper door 82 is pivotally attached to a horizontal bottom edge of the inlet opening. Flapper door 82 floats in the water so that movement of water through the inlet opening causes a pivoting of the flapper door 82 about the lower edge of the inlet opening. When water flows through the inlet into the filtering skimmer, the flapper door 82 pivots to an open position. If water begins to flow from the enclosure through the inlet opening back into the pond, the flapper door 82 pivots to a closed position but is not watertight and will not prevent backflow.

A sack-like net 20, 120 is disposed within the filtering skimmer and arranged so that water flowing into the filtering skimmer 16, 116 through the inlet opining flows into an opening in the net. Net 20, 120 is preferably removably attached to the filtering skimmer, such as with a series of hooks, to facilitate easy cleaning of the net 20, 120. When water is flowing into filtering skimmer 16, 116 through the inlet, leaves and other items which are floating on the surface of the water are carried through the inlet and entrained in net 20, 120, whereby such leaves and items are removed from the pond.

To remove water from the filtering skimmer 16, 116 and return it back to the pond, a pump 24, 124 is provided to circulate pond water through the filtering system.

To filter nutrients out of the pond water after the water has flowed through net 20, 120, and before the water is pumped back into the pond, a biological filter element 22, 122 is disposed between net 20, 120 and pump 24, 124. The biological filter element 22, 122 includes one or more planar filter mats which provide a large surface area for attachment of filtering bacteria. Many different types of filter mats may be used in the biological filter elements 22, 122. However, low-density material such as nonwoven polyester/nylon blend filters have been found to be particularly efficient. The filtering bacteria may be deposited on the filter mat by pouring such bacteria directly on the mat. Such filtering bacteria may be obtained commercially from any of a variety of sources.

In accordance with another aspect of the invention, there is provided a filtering skimmer 216 (FIG. 4) configured to allow a filtering element 220 to be disposed in the filtering skimmer 216 in a substantially horizontal orientation (i.e., with the substantially planar filtering element being arranged substantially parallel with a horizontal plane), or to allow a filtering element 22 to be disposed in the filtering skimmer 216 in a substantially vertical orientation (i.e., with die planar filtering element being arranged at substantially a right angle with respect to a horizontal plane). The term "substantially vertical" means that the filter is arranged either vertically or at a slight angle with respect to a vertical plane (e.g., at an angle less than about 40 degrees, and more typically less than about 20 degrees from a vertical plane). Similarly, the term "substantially horizontal" means that the filter is arranged either horizontally or a slight angle with respect to a horizontal plane (e.g., less than about 40 degrees and more typically less than about 20 degrees from a horizontal plane. In the illustrated embodiment, filtering skimmer 216 is defined by a substantially horizontal bottom wall 282, substantially vertically upright front wall 283, substantially vertically upright backwall 284, and substantially vertically upright sidewalls 285 and 286. Specific means for facilitating vertical mounting of the filter element 222 include vertically recessed channels or grooves 287 in walls 283 and 284 to receive a filter holder 288 containing filter 222. FIG. 2 shows filter 22 mounted in a vertical orientation.

Figure 4:
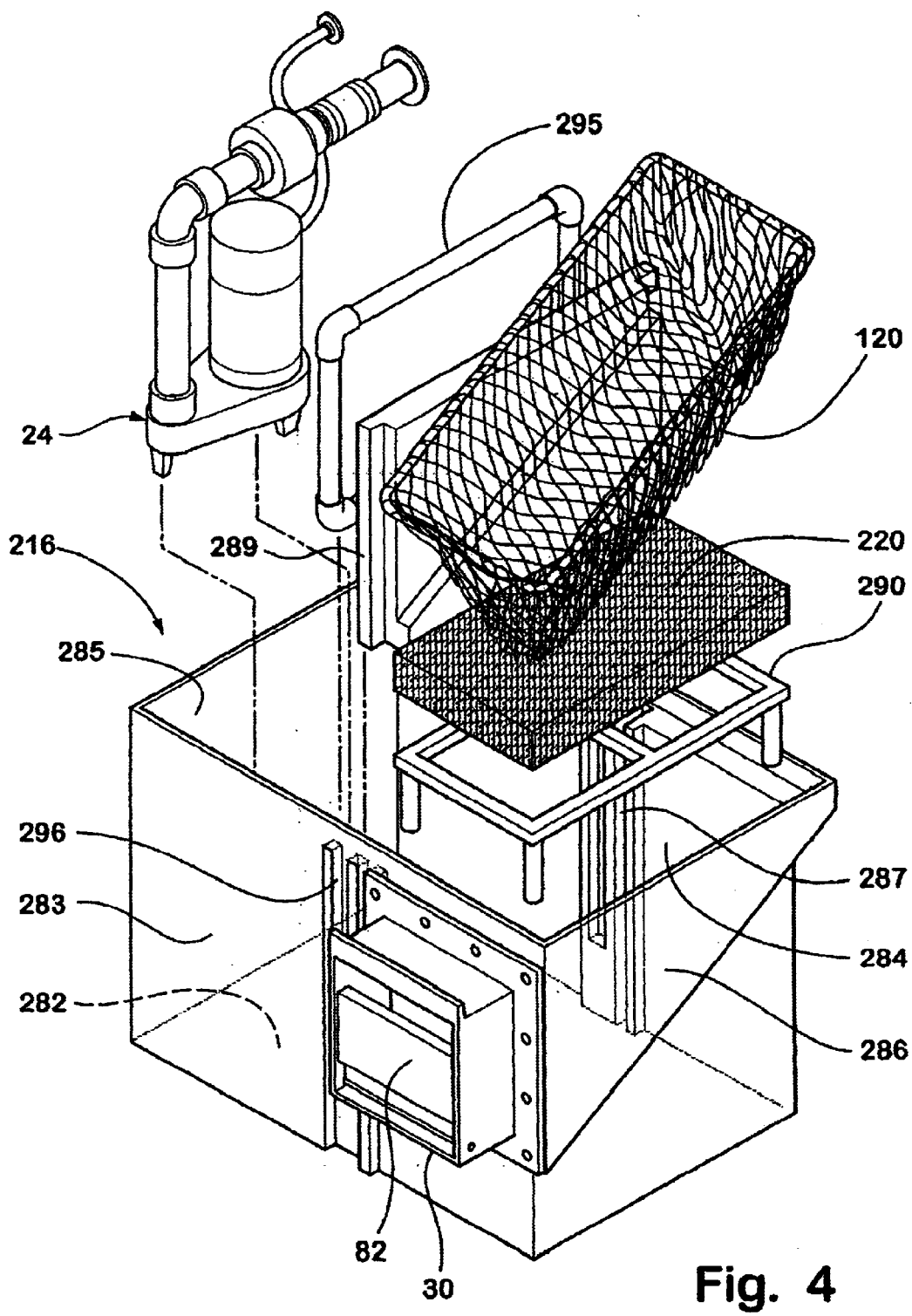
FIG. 4 is a perspective view of a convertible filtering skimmer which facilitates either horizontal or vertical mounting of a filtering element.
Figure 5:
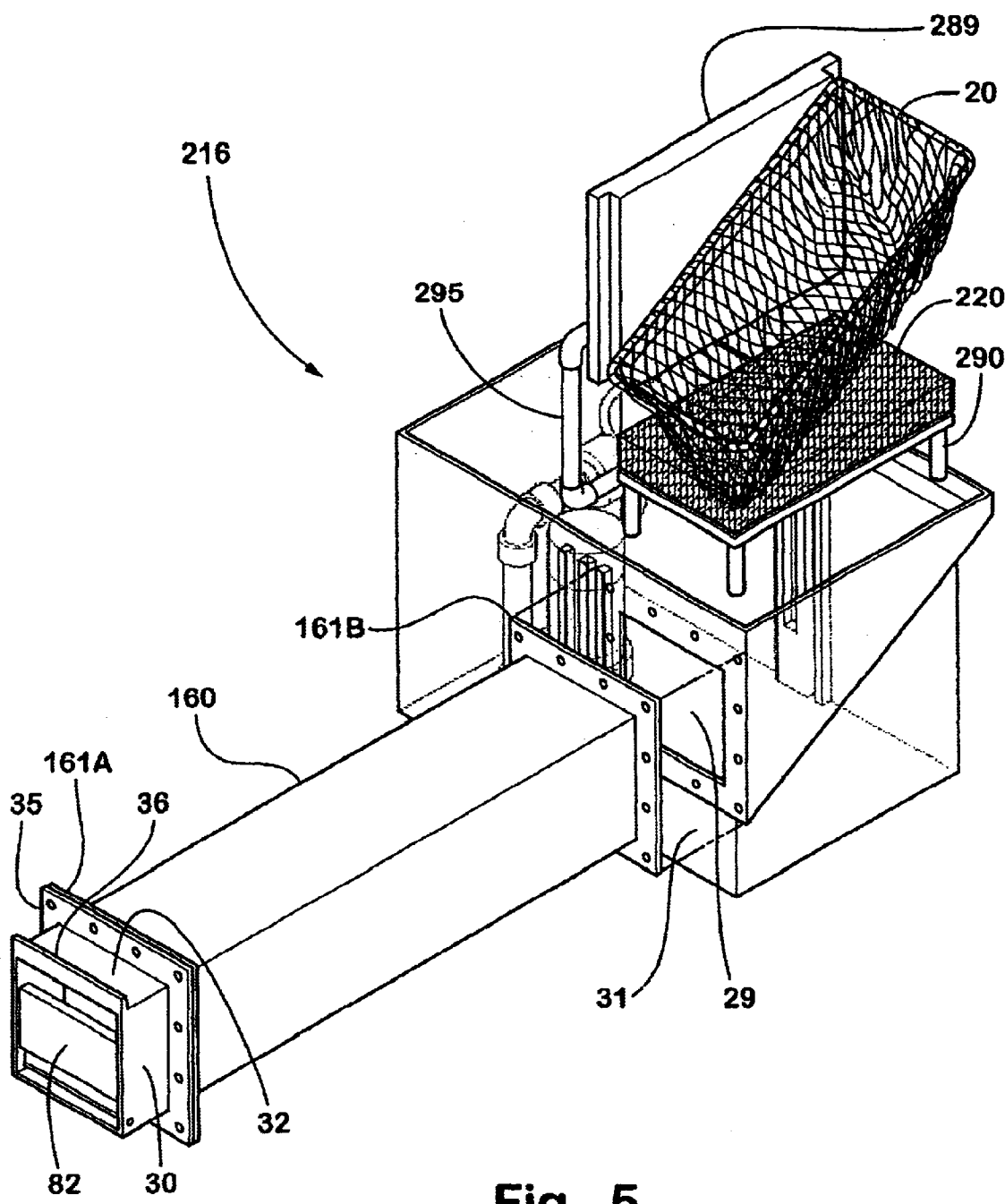
FIG. 5 is a perspective view of the filtering skimmer shown in FIG. 4, with a filter element installed in a substantially horizontal orientation.

Alternatively, a removable partition 289 can be inserted into grooves 287, and filter 220 can be inserted into filtering skimmer 216 in a substantially horizontal orientation as shown in FIG. 4. In this case, filter holder 288 rests on filter support stand 290.

In the substantially vertical orientation, removal of the filter holder and filter is extremely easy and involves merely grasping an upper edge of the filter holder and pulling it from the grooves 287. However, a disadvantage with the vertical orientation is that due to a relatively lower average hydrostatic head pressure across the area of the filter 222, plugging can cause inadequate flow through the filter more quickly than with the horizontal orientation wherein the filter 222 is exposed to a higher average hydrostatic pressure over the area of the filter. Thus, the vertical orientation is preferred for ease of filter cleaning/replacement, but requires more frequent cleaning/replacement, and horizontal orientation is preferred for less frequent cleaning/replacement, but requires more effort for cleaning/replacement. In particular, replacement of the filter in the horizontal orientation requires removal of net 20, and reaching down through the water to remove the filter.

As best illustrated in FIG. 4, a rigid sidewall support member 295 is inserted into opposing vertical channels 296, 298 defined in the sidewalls to stiffen the walls of the filtering skimmer 216 and extends across the internal chamber of the filtering skimmer 216, thereby preventing the surrounding earth from deforming the sidewalls inwardly toward each other when the filtering skimmer 216 is installed in the ground. Illustrated support member 295 is comprised of polyvinyl chloride (PVC) pipe and elbows to form a rectangular closed circuit.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. An ornamental pond, comprising:
a fish safe plastic sheet liner disposed on a pond bed; and
a filtering skimmer including:
    an enclosure defining an internal chamber, the enclosure having a substantially upright sidewall with a fluid inlet aperture defined in the upright sidewall to allow water to flow from an ornamental pond into the internal chamber, the filtering skimmer containing a pump and a filtering element disposed in a fluid pathway between the inlet and the pump, and a conduit projecting laterally away from the sidewall and from the inlet aperture, the conduit having a substantially horizontal upper wall that defines a ledge onto which pebbles, stones or other materials may be deposited and retained to conceal the inlet of the filtering skimmer.

2. The ornamental pond of claim 1, wherein a lip projects upwardly from an outer end of the conduit to help retain pebbles, stones or other material on the ledge.

3. An ornamental pond, comprising:

a fish safe plastic sheet liner disposed on a pond bed; and a filtering skimmer including:

an enclosure defining an internal chamber, the enclosure having a substantially upright sidewall with a fluid inlet aperture defined through the upright sidewall to allow water to flow from an ornamental pond into the internal chamber, the filtering skimmer containing a pump and a filtering element disposed in a fluid pathway between the inlet and the pump; and an elongated extension tube attached to the fluid inlet to provide a fluid passageway from an ornamental pond to the filtering skimmer inlet, whereby the filtering skimmer may be spaced away from an edge of the ornamental pond and the elongated extension tube can be concealed underground.

* * * * *

UNITED STATES PATENT AND TRADEMARK OFFICE
CERTIFICATE OF CORRECTION

PATENT NO. : 6,709,580 B2
DATED : March 23, 2004
INVENTOR(S) : David M. Ouwinga

It is certified that error appears in the above-identified patent and that said Letters Patent is hereby corrected as shown below:

Title page,
Item [57], ABSTRACT,
Line 8, "skimmer land" should be -- skimmer and --.

Column 4,
Line 13, delete "OF".
Line 33, "pond 10" should be -- pond 110 --.
Line 57, "conduct 30" should be -- conduit 20 --.

Column 5,
Line 12, "generally" should be -- general --.
Line 33, "opining" should be -- opening --.
Line 67, "die" should be -- the --.

Signed and Sealed this

Ninth Day of November, 2004

JON W. DUDAS
*Director of the United States Patent and Trademark Office*